(12) United States Patent  (10) Patent No.: US 9,129,200 B2
Lavedas  (45) Date of Patent: Sep. 8, 2015

(54) PROTECTION SYSTEM FOR RADIO FREQUENCY COMMUNICATIONS

(71) Applicant: Raytheon Company, Waltham, MA (US)

(72) Inventor: Thomas G. Lavedas, Clifton, VA (US)

(73) Assignee: Raytheon Corporation, Waltham, MA (US)

( * ) Notice: Subject to any disclaimer, the term of this patent is extended or adjusted under 35 U.S.C. 154(b) by 66 days.

(21) Appl. No.: 13/663,860

(22) Filed: Oct. 30, 2012

(65) Prior Publication Data

US 2014/0118116 A1  May 1, 2014

(51) Int. Cl.
*G08B 13/14* (2006.01)
*H04K 1/02* (2006.01)
*G06K 19/06* (2006.01)
*G06K 19/073* (2006.01)
*H01Q 7/00* (2006.01)
*H01Q 1/22* (2006.01)

(52) U.S. Cl.
CPC .... *G06K 19/07336* (2013.01); *G06K 19/07327* (2013.01); *H01Q 1/2225* (2013.01); *H01Q 7/00* (2013.01)

(58) Field of Classification Search
CPC ....................................... G08B 13/14
USPC .......... 340/10.1–10.5, 572.7, 572.8; 235/492, 235/451; 455/1, 90.3; 380/252
See application file for complete search history.

(56) References Cited

U.S. PATENT DOCUMENTS

| 3,774,221 A | 11/1973 | Francis |
| 3,823,403 A | 7/1974 | Walter et al. |
| 4,160,978 A | 7/1979 | DuHamel |
| 4,217,550 A | 8/1980 | Blassel et al. |
| 4,375,289 A | 3/1983 | Schmall et al. |
| 4,680,591 A | 7/1987 | Axford et al. |
| 4,791,285 A | 12/1988 | Ohki |
| 4,920,352 A | 4/1990 | Martensson et al. |
| 4,977,614 A | 12/1990 | Kurcbart |
| 5,128,686 A | 7/1992 | Tan et al. |
| 5,221,902 A | 6/1993 | Jones et al. |
| 5,237,165 A | 8/1993 | Tingley, III |
| 5,321,412 A | 6/1994 | Kopp et al. |
| 5,459,451 A | 10/1995 | Crossfield et al. |
| 5,513,383 A | 4/1996 | Tsao |
| 5,572,226 A | 11/1996 | Tuttle |
| 5,602,556 A | 2/1997 | Bowers |
| 5,817,207 A | 10/1998 | Leighton |

(Continued)

FOREIGN PATENT DOCUMENTS

JP  H11-313017  11/1999
WO  WO 2006/107862 A2  10/2006
WO  WO 2010/002821 A1  1/2010

OTHER PUBLICATIONS

Andre Kurs, Wireless Power Transfer Via Strongly Coupled Magnetic Resonances, Science, Jul. 6, 2007, pp. 83-86, vol. 317.

(Continued)

*Primary Examiner* — Nam V Nguyen
(74) *Attorney, Agent, or Firm* — Daly, Crowley, Molford & Durkee, LLP (57) ABSTRACT

A system for protecting radio frequency (RF) communications and related techniques includes generating masking signals at an RF device such as a radio frequency identification (RFID) card.

28 Claims, 5 Drawing Sheets

(56) References Cited

U.S. PATENT DOCUMENTS

| | | | |
|---|---|---|---|
| 5,903,242 A | 5/1999 | Tsuru et al. | |
| 5,945,958 A | 8/1999 | Staufer et al. | |
| 6,031,508 A | 2/2000 | Ishizuka et al. | |
| 6,147,605 A | 11/2000 | Vega et al. | |
| 6,195,006 B1 | 2/2001 | Bowers et al. | |
| 6,204,764 B1 | 3/2001 | Maloney | |
| 6,208,235 B1 | 3/2001 | Trontelj | |
| 6,208,874 B1 | 3/2001 | Rudisill et al. | |
| 6,220,516 B1* | 4/2001 | Tuttle et al. | 235/492 |
| 6,281,794 B1 | 8/2001 | Duan et al. | |
| 6,429,768 B1 | 8/2002 | Flick | |
| 6,535,175 B2 | 3/2003 | Brady et al. | |
| 6,597,318 B1 | 7/2003 | Parsche et al. | |
| 6,696,952 B2 | 2/2004 | Zirbes | |
| 6,814,284 B2 | 11/2004 | Ehlers et al. | |
| 6,825,754 B1 | 11/2004 | Rolin | |
| 6,970,141 B2 | 11/2005 | Copeland et al. | |
| 6,989,750 B2 | 1/2006 | Shanks et al. | |
| 7,019,651 B2 | 3/2006 | Hall et al. | |
| 7,042,419 B2 | 5/2006 | Werner et al. | |
| 7,064,668 B2 | 6/2006 | Porad | |
| 7,100,835 B2 | 9/2006 | Selker | |
| 7,215,293 B2 | 5/2007 | Chen et al. | |
| 7,283,044 B2* | 10/2007 | Bandy | 340/505 |
| 7,330,161 B2 | 2/2008 | Matsugatani et al. | |
| RE40,145 E | 3/2008 | Leighton | |
| 7,375,639 B2 | 5/2008 | Dixon et al. | |
| 7,460,071 B2 | 12/2008 | Manholm et al. | |
| 7,591,415 B2 | 9/2009 | Jesme | |
| 7,612,675 B2 | 11/2009 | Miller et al. | |
| 7,612,676 B2 | 11/2009 | Yuen et al. | |
| 7,714,724 B2 | 5/2010 | Halope et al. | |
| 7,714,791 B2 | 5/2010 | Lavedas | |
| 7,808,389 B2* | 10/2010 | Finkenzeller | 340/572.4 |
| 8,121,532 B2* | 2/2012 | Huang | 455/1 |
| 8,466,791 B2* | 6/2013 | Goto et al. | 340/572.7 |
| 8,723,649 B2* | 5/2014 | Lavedas | 340/10.1 |
| 2003/0197653 A1 | 10/2003 | Barber et al. | |
| 2004/0006424 A1 | 1/2004 | Joyce et al. | |
| 2004/0100359 A1* | 5/2004 | Reade et al. | 340/5.2 |
| 2004/0207527 A1 | 10/2004 | Shanks et al. | |
| 2005/0093677 A1 | 5/2005 | Forster et al. | |
| 2005/0093678 A1 | 5/2005 | Forster et al. | |
| 2005/0212673 A1 | 9/2005 | Forster | |
| 2007/0075145 A1* | 4/2007 | Arendonk | 235/492 |
| 2007/0185546 A1 | 8/2007 | Tseng et al. | |
| 2007/0290916 A1* | 12/2007 | Ofek | 342/19 |
| 2008/0231458 A1 | 9/2008 | Fein | |
| 2008/0238684 A1 | 10/2008 | Tuttle | |
| 2009/0021343 A1 | 1/2009 | Sinha | |
| 2009/0041241 A1* | 2/2009 | Dobyns et al. | 380/252 |
| 2009/0051539 A1* | 2/2009 | Ho | 340/572.7 |
| 2010/0001080 A1 | 1/2010 | Sim et al. | |
| 2010/0069011 A1 | 3/2010 | Carrick et al. | |

OTHER PUBLICATIONS

Two RF Inputs Make a Better RFID Tag, May 2006, Symbol The Enterprise Mobility Company, pp. 1-4.

Symbol Technologies Launches Portfolio of RFID Gen 2 and Specialty Tag Inlays, May 1, 2006, pp. 1-2.

Mardev Asia, May 1, 2006, Symbol Technologies Launches Portfolio of RFID Inlays and Trays, 1 page.

Abedin, M.F., A Low Profile Dipole Antenna Backed by a Planar EBG Structure, Department of Electrical Engineering, 2006, pp. 13-16 U.of S.C.

Apostolopoulos, O.G. et al., Electromagnetic Band Gap Characteristics From Closely Coupled Double Layer and Dipole and Tripole Arrays, 2003, The Institute of Electrical Engineers, pp. 409-412.

Whites, Keith W. et al., Easily Designed and Constructed High Impedance Surfaces, Department of Electrical and Computer Engineering, 2003, pp. 407-410, South Dakota School of Mines and Technology, Rapid City, SD.

Sergio et al., Design Methodology for Sievenpiper High-Impedance Surfaces: An Artificial Magnetic Conductor for Positive Gain Electrically Small Antennas, 2003, pp. 2678-2690, IEEE Antennas and Wirless Propagation, vol. 51, No. 10.

Sievenpiper, D., et al., High-Impedance Electromagnetic Surfaces with a Forbidden Frequency Band, 1999, pp. 2059-2074, IEEE Transactions on Microwave Theory and Techbiques, vol. 47, No. 11.

Ukkonen, L., et al., Effects of Metallic Plate Size on the Performance of Microstrip Patch Type Tag Antennas for Passive RFID, 2005, pp. 410-413, IEEP Antennas and Wireless Propagation Letters, vol. 4.

Kurz et al.; "Wireless Power Transfer via Strongly Coupled Magnetic Resonances;" www.sciencemag.org; vol. 317, dated Jul. 6, 2007; pp. 83-86.

PCT International Preliminary Report on Patentability of the ISA datec Jan. 5, 2011 for PCT Patent App. No. PCT/US2009/049136; 8 pages.

PCT Notification of Transmittal of the International Search Report and the Written Opinion of the ISA dated Aug. 4, 2009 for PCT Patent App. No. PCT/US2009/049136; 1 page.

PCT International Search Report of the ISA dated Aug. 4, 2009 for PCT Patent App. No. PCT/US2009/049136; 4 pages.

PCT International Written Opinion of the ISA dated Aug. 4, 2009 for PCT Patent App. No. PCT/US2009/049136; 7 pages.

Zetter, K. "Jamming Tags Block RFID Scanners", wired magazine online, Mar. 1, 2004, 4 pages, http://www.wired.com/techbiz/media/news/2004/03/52468?currentPage=all, last accessed Feb. 28, 2011.

Savry, O., et al., "Secure RFID transactions with a noisy reader," Design and System Integration Division Defense & Security, Scientific Report 2008, Cea Leti, p. 9.

U.S. Appl. No. 13/027,434, Thomas G. Lavedas, et al., filed on Feb. 15, 2011, 38 pages.

\* cited by examiner

PROTECTION SYSTEM FOR RADIO FREQUENCY COMMUNICATIONS

FIELD OF THE INVENTION

The system and techniques described herein relate generally to RF communications and, more particularly, to protecting RF communications from unwanted exposure and eavesdropping and even more particularly to protecting RF communications in radio frequency identification (RFID) systems from unwanted exposure and eavesdropping.

BACKGROUND OF THE INVENTION

As is known in the art, radio-frequency identification (RFID) systems are typically wireless non-contact systems which use radio-frequency (RF) electromagnetic fields to transfer information from an RFID card or tag to a reader, for the purposes of automatic identification and/or tracking.

As is also known, RFID systems are used in a wide variety of different applications including but not limited to evacuation management, security systems, asset tracking, manufacturing, people tracking (e.g. students, employees, etc . . . ).

One vulnerability known to exist in conventional RFID systems occurs when an interloper reader (e.g. eavesdropper 14) or other rogue device eavesdrops on authentic transactions and RF communications between authorized tags and readers. Such rogue devices can access passwords or data using standard, inexpensive lab equipment. Like wiretapping (without the wires) this capability exposes confidential information to others who may put it to new and nefarious uses. Such interloper readers or other rogue devices operate in a so-called "side channel."

Figure 1:
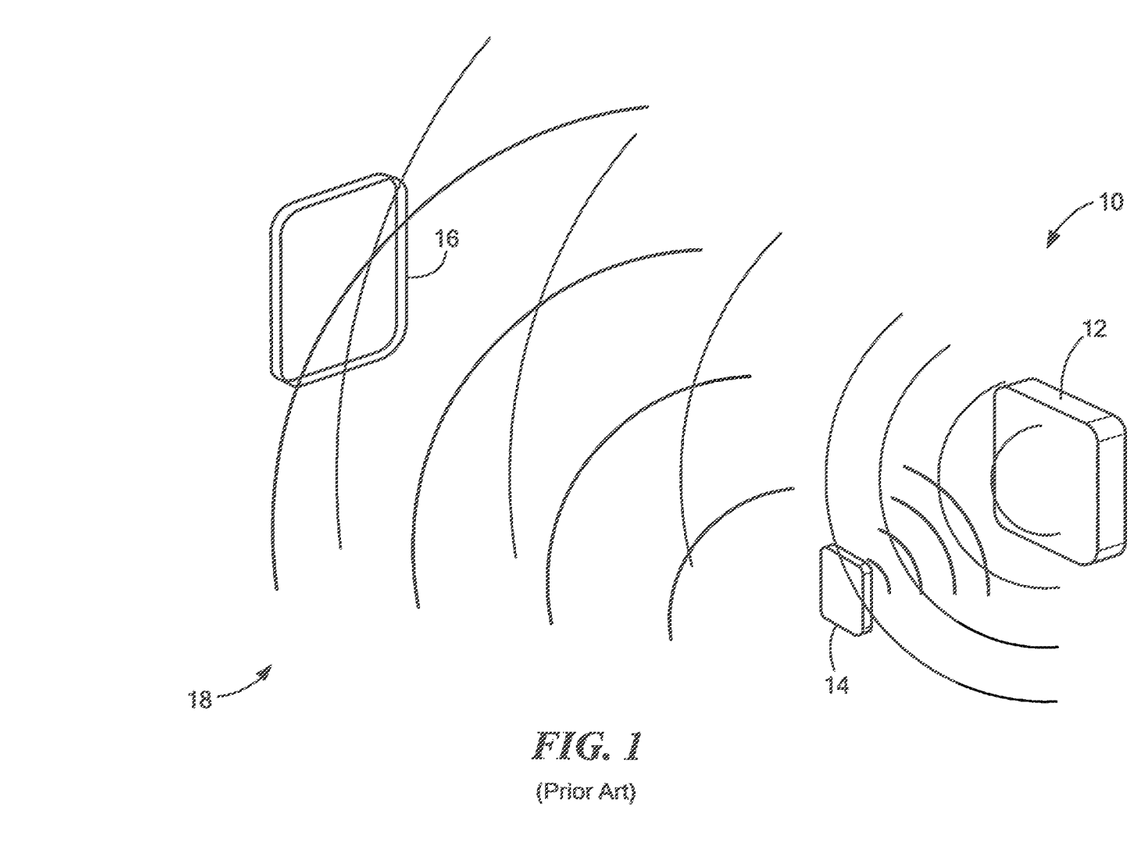
FIG. 1 is a block diagram of prior art radio frequency identification (RFID) system illustrating eavesdropping through a side channel.

As illustrated in FIG. 1, a typical conventional RFID system 10 includes an RFID card 12 capable of communicating with an RFID reader 14. One or more unauthorized devices 16 intercept and receive information in the RF domain via side channel 18, Such information may include transactional information, such as passwords transmitted during RFID card authentication transactions and/or per data. Accordingly, organizations advocating greater public privacy and security protections have raised concerns over RFID system vulnerabilities in response to efforts to expand the use of RFID enabled documents and devices. These concerns have limited industry efforts to make RFID systems more widely available for a variety of useful applications.

One problem with preventing eavesdropping is that the RFID card must be exposed to the RF domain as part of an interrogation by a legitimate RFID reader. This exposes the card-reader communication (and thus the card-reader transaction) to any unauthorized listener or eavesdropper (e.g. device 16) that might be present. Furthermore since such eavesdroppers are typically passive (i.e. they do not emit any signals), the mere presence of an eavesdropper is undetectable. Moreover, the standoff distance between an eavesdropping device and the card-reader can easily be on the order of ten meters or more.

To reduce vulnerabilities to unauthorized access, a number of techniques have been used including but not limited to: limiting the data stored on the ID cards to not contain information beyond ID numbers that are used as pointers to a record in a database (and thus without access to the database, the ID number is of no consequence); encrypting card information (thus, making the information on the cards useless without the means to decrypt the information); shielding ID cards from eavesdroppers with a protection packet (e.g. using a simple conductive surface placed next to or around a card thereby making it unreadable).

Some RFID devices, such as E-Passports and Mifare cards (i.e. contactless 'smart' credit cards, fare cards, etc.), do necessarily contain sensitive information. In practical systems, encryption is not widely applied, even when present in the RFID card and/or reader. Moreover, when encryption is used, the sophistication of the encryption is often at as level such that a determined eavesdropper can defeat the encryption that is currently available. Cards cannot be shielded when presented for their intended use (i.e. use of protection packets for protecting cards from being read when not in use does not offer any protection when a valid transaction is in progress).

Another approach is to provide a system which utilizes a masking signal during an RFID transaction which occurs between an RFID card and an RFID reader. One system which utilizes this approach is described in U.S. pending application Ser. No. 13/027,560, filed on Feb. 15, 2011 and entitled ANTENNA FOR PROTECTING RADIO FREQUENCY COMMUNICATIONS and assigned to the assignee of the present application. The aforementioned application describes protection for an RFID card from electronic eavesdroppers by use of a jamming signal generated by (or around) an RFID reader. A loop antenna and a suitable RFID reader-based masking signal substantially degrade unintended reception while reducing (or ideally minimizing) the impact to the intended reader.

Nevertheless in view of the above-noted vulnerabilities, substantial resistance remains to wider use of RFID cards. It would, therefore, be desirable to provide a system and technique to protect RFID cards presented at a read point from being overheard and cloned or otherwise exploited via side channel and other attacks.

SUMMARY OF THE INVENTION

In accordance with the concepts, systems, circuits and techniques described herein, it has been recognized that the ability to isolate a noise transmitter from an authorized receiver can form the basis for protecting against unauthorized reading of information from radio frequency (RF) devices such as radio frequency identification (RFID) cards without requiring changes to an RFID reader. That is, as described herein, a transmitter provides an interference signal (e.g. in the form of a noise or spoofing signal) at an RF device (e.g. an RFID card) to defeat eavesdropping, while an intended RFID receiver remains isolated from the interference signal.

In accordance with one aspect of the concepts described herein, a cross-fed antenna having a pair of loops and two isolated inputs is described. When fed with signals that are in phase quadrature, the cross-fed antenna generates a substantially omni-directional radiation pattern having antenna pattern nulls in a predetermined direction. In addition, the loop antenna and feed system described herein is structured to isolate the antenna from a second nearby loop antenna.

In one embodiment, an RFID system includes a jamming system disposed immediately adjacent an RFID card which is responsive to signals from an RFID reader. The jamming system includes an antenna and a transmitter. The operation of the antenna and transmitter is functionally separate from the function of the RFID card. The antenna and transmitter cooperate to output an interfering (noise) signal of a type and level such as to mask a response of an RFID-card to an RFID reader. Thus, the response of the RFID card is intermingled with the interfering transmission provided by the jamming system. This keeps an unintended receiver (e.g. a so-called "eavesdropper") from correctly interpreting (or eavesdropping) signals provided by the RFID card (e.g. response signals provided to an RFID reader). Significantly, the antenna is provided having antenna radiation characteristics which prevent interference with the performance of a local, authorized receiver (e.g. an RFID reader). In particular, the antenna forms an RF radiation pattern which isolates the RFID card and the intended RFID reader from the interfering signal. In one particular embodiment, the antenna is provided as a cross-fed antenna having a pair of loops and a pair of feed points.

In accordance with the concepts, techniques and systems described herein, a jamming system includes a transmitter, a cross-fed antenna and a frame or carrier configured to hold the transmitter and antenna in the vicinity of an RFID card. The jamming system generates a masking signal to protect information disposed on the RFID card against eavesdropping.

With this particular arrangement, an RFID card is provided which protects information transferred between the RFID card and an RFID reader even when the Intended RFID reader is not instrumented with a protection system. This approach thus offers advantages over prior art techniques.

Thus, in one aspect, the system and technique described herein differs from prior systems and techniques in that the jamming signal originates at the RFID card itself, rather than from the vicinity of the RFID reader.

In a further aspect the jamming signal is emitted through a cross-fed antenna which provides an antenna radiation pattern having a donut shape and an antenna pattern null in a predetermined direction. The antenna of the jamming system must be aligned with an RF device (e.g. an RFID) card) such that an intended reader is deposed in the antenna pattern null when the RF device is aligned with the RF reader.

Also described is a system which includes a noise injecting device capable of injecting a noise signal in the immediate vicinity of an RF device (e.g. an RFID card) to be protected (i.e. the system generates a jamming field at the RF device). Since it is necessary to isolate an intended receiver from the interference signal, the noise injecting device comprises a jamming antenna having a characteristic such that it exhibits a null to any other antenna that is placed parallel to it along a line normal to its principle plane. The jamming antenna is coupled to a transmitter. The transmitter generates a jamming (noise) signal which is emitted through the jamming antenna. The null of the jamming antenna is directed toward an intended receiver. Thus, since the intended receiver is located along the null it is substantially isolated from the jamming signal. In one embodiment, the transmitter is provided as a relatively small, battery operated transmitter.

Thus, one important feature of the jamming antenna described herein is that it exhibits a null to any antenna placed parallel to it along a line normal to its principle plane. Therefore, no noise is coupled from the jamming antenna to an RFID card held near it and centered relative to its center.

In an RFID system, a reader antenna meets the criteria for immunity to the noise source at the point that the RFID card is optimally oriented toward the receiver.

In one embodiment, the jamming antenna is provided as a cross-fed antenna equivalent to two figure-eight style antennas that are superimposed on each other and fed at two feed points with signals that are orthogonal (90 degrees out of phase) to each other. Each of the figure-eight equivalent antennas projects a field at right angles to the other. By introducing a 90 degree phase difference between the two feeds, the resultant fields are independent of each other in time, resulting in a donut shaped antenna pattern (with the nulls in the antenna pattern aligned with the "holes" in the donut shaped antenna pattern).

In contrast to a system which utilizes a conventional figure eight antenna, the jamming system described herein, utilizes a jamming antenna comprising a pair of loops a pair of isolated feed input and a loop antenna feed system. When the antenna inputs are fed with signals that are in phase-quadrature, the jamming antenna creates an omni directional radiation pattern. In addition, a null of the omni directional radiation pattern is such that the jamming antenna is isolated from a second nearby antenna such as a loop antenna.

In accordance with a further aspect of the concepts, systems and techniques described herein, a cross-fed antenna comprises a substantially identical pair of loops fed from a common feed point. When fed via the common feed point, the two equal sized loops have currents that travel in opposite sense through each loop. That is, clockwise in one and counter-clockwise in the other. In one embodiment adjacent legs of the two loops used in the antenna are joined into a single conductor, thus forming a single loop having a common centrally located feed. This arrangement simplifies construction while maintaining a figure-eight-type cancellation performance. The antenna loops may be provided in a variety of different shapes including, but not limited to rectangular, circular, oval, triangular, and other regular and non-regular shapes. Thus, a wide variety of shapes may be used for each of the component halves of this antenna. One requirement for the two halves is that they have at least half-plane symmetry around the feed leg, such that each half of the structure is equal in size and has a common side.

This structure differs substantially from previous radiation canceling antennas in that the two loop structures are fed in parallel, rather than via a conventional series-fed, figure-eight structure. Such a parallel, two loop approach does not require the antenna conductors to cross over each other anywhere within the structure. In addition, it provides a centrally located feed point.

Each of the loops in the cross-fed antenna have two points which are at ground potential (zero volts); when fed by a source that is balanced against ground, that is, supplies a voltage between $-V$ and $+V$ relative to ground. These points are where a line drawn vertically from the feed point intersects the outer conductor at the top and bottom of the outer edge of the loop. This means that it is possible to connect to these two points with an additional feed, without affecting the characteristics of the original loop configuration, thus instituting a new, independent feed point that is orthogonal to the original. The resultant field created by this additional feed point is rotated 90 degrees relative to the field of the first feed near its center, Feeding the two feed points in time-quadrature (90 time phase difference) creates a donut shaped field that is omni-directional in azimuth in the planes parallel to the plane of the antenna.

An important aspect of this configuration is that the near field components of the H-field are of an opposite polarity between the two halves of each antenna, i.e. left and right or top and bottom. This polarity opposition leads to decoupling of the resultant antenna from any nearby single turn loop that is parallel to the cross-fed antenna and positioned along its normal. Examples include those contained in a standard LF or HF, inductively coupled RFID card. There exists, therefore, a position where the RFID card is subjected to equal and opposite signals from the two halves of the antenna. This effect results in a cancellation of the two signal components, leading to a minimum coupling between the RFID card and a signal impressed on the antenna.

In addition, when properly positioned in front of an interrogation device (e.g. an RFID reader), the interrogation device is also immune to the signal emanating from the cross-fed antenna. That is, it is positioned within the null region of the cross-fed antenna.

Therefore, it is possible to introduce a signal in the vicinity of an RFID card such that the transaction between the RFID card and its intended RFID reader is masked by an intentional interfering signal without adversely affecting normal RFID card-reader operation. In this way, the RFID card-reader transaction is made more secure. That is, any device used in an attempt to eavesdrop on the transmissions between the RFID card and the intended RFID reader receives the transmissions embedded in the interference, thereby protecting the card's information from unauthorized listeners.

Another feature of this approach is that it does not require any modification to existing RFID reader infrastructure. The entire system for protecting the card is self contained at the card.

A signal source used to drive a cross-fed antenna in a jamming device can be as simple as a noise source, a power amplifier, power source and an antenna tuning/matching network. Depending upon the intended life of the jamming device, the prime power could be provided by a small number of inexpensive coin style batteries. It should, therefore, be possible to house the entire jamming device (e.g. signal source and antenna) in a package similar in size to a common ID card.

Additionally, in an alternate implementation, a secondary antenna is introduced into the jamming device. The secondary antenna couples a portion (or sample) of the RFID reader's interrogation signal. In one exemplary embodiment, the secondary antenna is provided as a pick-up loop. When properly positioned (i.e. positioned in the null of the cross-fed antenna) the secondary antenna is isolated from the interference signal applied to the cross-fed antenna.

The sample from the RFID reader may be processed for use as a local oscillator signal to implement a coherent spoofing algorithm. That is, the interfering signal is structured like that of one or more RFID devices (ID cards) in the immediate vicinity of the card being protected. Ideally, the interfering signal is structured identically like that of one or more RFID devices. These added signals appear as code collisions to the eavesdropping receiver making it nearly impossible for the eavesdropper to distinguish the interfering signals from the real RFID responses. However, because of the isolation provided from the jammer antenna relative to the nearby intended reader, the intended receiver remains unaffected by this spoofing signal.

In an alternate implementation, this secondary antenna also provides the ability to activate the jammer signal only when it is in the near vicinity of an interrogating reader. This ability conserves the battery and limits the amount of information the eavesdropper can gain from long term data collection of the jammer's signal. Limiting access to long term samples of the jammer signal further improves the robustness of the protection by hampering techniques to filter or cancel the interference based on a prior knowledge of the jammer signal's characteristics.

With this technique, a transponder which is able to recognize and not respond to reflected interrogation signals is provided. This technique utilizes some or all of the data available from the waveform to verify that the second received waveform is a reflection of the first waveform. This technique is also flexible and can be tailored for operation with reflected signals having different amounts of delays.

DETAILED DESCRIPTION OF THE PREFERRED EMBODIMENTS

Before describing a system for protecting radio frequency (RF) communications from unwanted exposure and eavesdropping and the techniques associate therewith, it should be appreciated that, in an effort to promote clarity, reference is sometimes made herein to a specific type of RF communications system referred to as radio-frequency identification (RFID) system. Such references are not intended as and should not be construed as limiting the concepts, systems, circuits and techniques described herein to RFID systems. Rather, the concepts, systems, circuits and techniques described herein find application in a wide variety of different types of transponder systems and other RF systems including, but not limited to RF communication systems and personal area networks.

It should also be appreciated that the cross fed antenna's near field is circularly polarized, which might prove useful in near-field sensing applications. One such application is in the RF spectroscopy technique known as nuclear quadrupole resonance. Such a technique is used in remote sensing of narcotics or explosives, for example and such a polarization scheme could prove beneficial in such systems (e.g. to improve system sensitivity). The cancellation effect of the antenna also means it has a reduced sensitivity to distant noise sources, like atmospheric (lightning), man-made and galactic noise. This effect can improve the sensitivity of the receiver in such a system.

A system built around a pair of such antennas might serve useful in creating a short range (in the range of about 10 m to about 100 meters), low probability of detection intercom system; again because of the far-field cancellation characteristics of the antenna.

Accordingly, those of ordinary skill in the art will appreciate that the circuits and techniques described herein within the context of an RFID system could equally be taking place in other types of transponder systems or RF communication systems or networks including, but not limited to personal area networks (e.g. networks which utilize Bluetooth or other forms of RF communication technologies over relatively short distances).

Also, before describing a system for protecting radio frequency (RF) communications from unwanted exposure and eavesdropping and the techniques associate therewith, some introductory concepts and terminology are explained.

As used herein, the following terms should be understood to have the indicated meanings: when an item is introduced by "a" or "an," it should be understood to mean one or more of that item; also the terms "first," "second," and the like may be used to distinguish one element from another (as opposed to always denoting an order, quantity, or importance); the word "comprises" means includes but it not limited to and the words "comprising" and "having" mean including but not limited to.

The phrase "masking signal" (also sometimes referred to herein as a "jamming signal") refers to an interference/noise signal that is stronger than a signal to be masked. For example, in the context of a radio frequency identification (RFID) system, a masking signal refers to an interference/noise signal having a signal level that is greater than a signal level of an RFID response signal and/or a signal that when combined with an RFID response signal is unreadable and/or degraded to be unreadable. Also, a masking signal can be a decoy signal as in a decoy signal appearing as a signal from an RFID card.

In general overview, in one aspect of the concepts, systems, circuits and techniques described herein, it has been recognized that the ability to isolate a noise transmitter from an authorized receiver may be used as a basis for protecting against the unauthorized reading (e.g. eavesdropping) of signals in RF communication systems. In one particular type of RF communication system corresponding to an RFID system comprising an RFID card and an RFID reader, this concept can be used to provide a RFID system which protects RF communications between the RFID card and reader without requiring changes to infrastructure of the RFID reader. That is, a transmitter envisioned here provides a noise or spoofing signal at the RFID card to defeat eavesdropping, while the intended RFID receiver remains isolated from the interference.

In one embodiment, an RFID system uses a cross-fed antenna in the vicinity of the RFID card to generate a masking signal. Thus, the masking signal originates at or proximate the RFID card, rather than from the vicinity of the RFID reader (or interrogator device or other transponder device). One advantage of such a system and technique is that the information being transferred is protected, even when the intended interrogator (e.g. an RFID reader) is not instrumented with a protection system.

Figures 2, 2A:
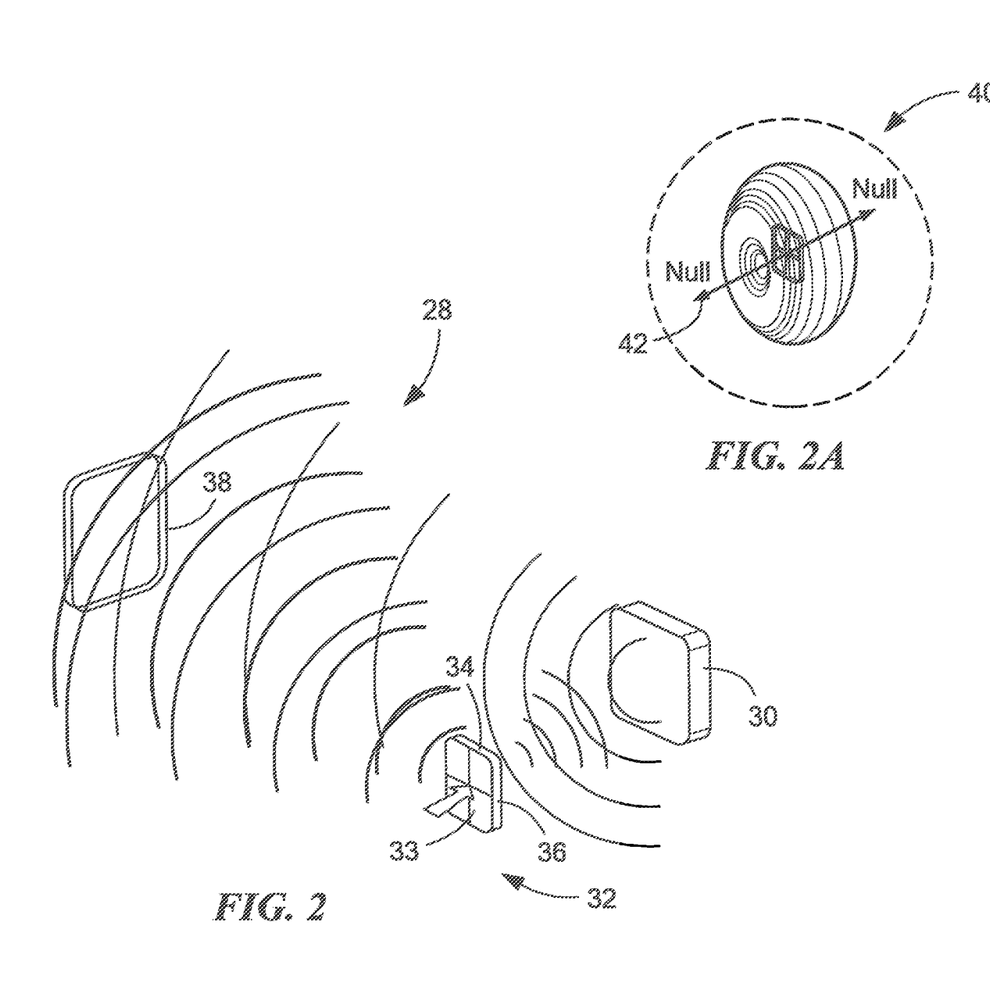
FIG. 2 is a block diagram of an RFID system illustrating denial of eavesdropping through jamming from an RFID Card.
FIG. 2A is a radiation plot illustrating the nulls of an antenna such as the type described in FIG. 2.

Referring now to FIG. 2, a radio frequency identification (RFID) system 28 includes an RFID reader 30 and an RFID card 32. RFID card 32 comprises a substrate having disposed thereon a conventional RFID antenna (not visible in FIG. 2) responsive to signals from RFID reader. Also disposed on the substrate is a cross-fed antenna 34 and an optional reader loop antenna 36. Also disposed on the substrate is a signal generator or transmitter (not visible in FIG. 2) which generates a masking signal which is emitted from and about RFID card 32 via cross-fed antenna 34.

In some embodiments, cross-fed antenna 34 and the transmitter may be provided as an integral part of RFID card 32. Thus, in this case, an RFID card having an integrated jamming system is provided. In some embodiments, optional loop antenna 36 may also be integrated onto the substrate.

In other embodiments all, some or one of cross-fed antenna 34 and/or an optional reader loop antenna 36 and/or the signal generator or transmitter may be provided separately from RFID card 32, and coupled to the RFID card 32 via a frame, carrier or other structure which may be coupled to RFID card 32.

Figure 3:
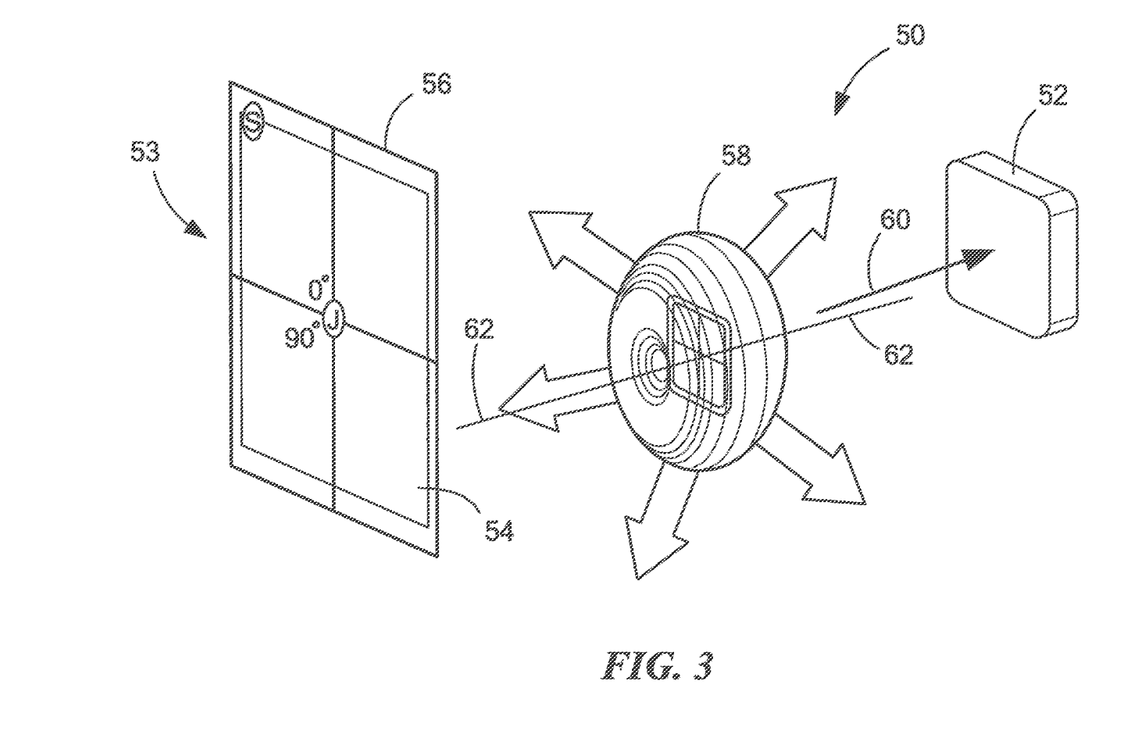
FIG. 3 is a block diagram of a quadrature fed jammer antenna coupled to an RFID card.

Referring now to FIG. 2A, an omni-directional antenna radiation pattern 40 (also referred to as "an antenna pattern" or "a radiation pattern" or more simple, "a pattern") having a null 42 in a predetermined direction represents the ideal type of pattern generated by a cross-fed antenna such as cross-fed antenna 34 in FIG. 3. The omni-directional antenna radiation pattern 40 is generated by feeding a cross-fed antenna with signals that are in phase quadrature. In this way, cross-fed antenna generates a substantially omni-directional radiation pattern. Antenna 34 is positioned relative to an RFID card to be protected (e.g. RFID card 32 in FIG. 3) such that when the RFID card is positioned proximate an RFID reader (e.g. RFID reader 30 in FIG. 3) so as to communicate with reader 30, the null 42 in the antenna pattern 40 generated by the cross-fed antenna is pointed in the direction of reader 30 while a jamming signal is emitted in other directions about the null direction.

Referring again to FIG. 2, in operation, when the transmitter provides signals to cross-fed antenna 34, cross-fed antenna 34 emits the masking signal. The masking signal (or "jamming signal") corresponds to an interference/noise signal having a signal level that is greater than a signal level of an RFID response signal (e.g. such as may be provided by RFID card 32) and/or a signal that when combined with an RFID response signal is unreadable and/or degraded to be unreadable by an eavesdropper 38. Thus, the masking signal emitted by cross-fed antenna 34 prevents emits eavesdropper 38 from the unauthorized reading (e.g. eavesdropping) of RF signals between RFID reader 30 and RFID card 32.

However, since the null in the antenna pattern generated by the cross-fed antenna 34 is pointed in the directing of reader 30, the signal level of the masking signal is below a threshold level for adversely affecting proper operation of reader 30 (ideally, the signal level of the masking signal presented to the reader is insignificant). The transmitter provides a noise or spoofing signal at the RFID card to defeat eavesdropping, while the intended RFID receiver remains isolated from the interference. Thus, RFID reader 30 can properly communicate with RFID card 32 even in the presence of the masking signal.

By generating a masking signal at or near the RFID card, an RFID system which protects RF communications between the RFID reader 30 card and reader 32 without requiring changes to infrastructure of the RFID reader is provided.

In those embodiments in which cross-fed antenna 34 and/or an optional reader loop antenna 36 are provided separately from RFID card 32, but are coupled to the RFID card, it is important that cross-fed antenna 34 and/or an optional loop antenna 36 are properly aligned with RFID card 32 so as to direct a null in an antenna pattern generated by cross-fed antenna 34 in a proper direction (i.e. a null aligned with an RFID reader when the RFID card is aligned with the RFID reader). Thus, while cross-fed antenna 34 and/or an optional loop antenna 36 may be disposed on or proximate to RFID card 32, the alignment must be such that a null in the antenna pattern of the cross-fed antenna is directed toward the RFID reader.

Referring now to FIG. 3, an RFID system 50 includes an RFID reader 52 and an RFID card 53. RFID card 53 includes an RFID card jamming system comprising a means for injecting a noise or masking signal in the immediate vicinity of the RFID card 53. In one embodiment, the means is provided as a transmitter and antenna which emits a jamming or masking signal which prevents an eavesdropper (e.g. eavesdropper 36 in FIG. 2) from reading signals exchanged between RFID reader 52 and RFID card 53 while at the same time isolating intended RFID reader 52 from the masking signal emitted from card (or more specifically emitted from the jamming system disposed around or on RFID card 53.

In one embodiment, the RFID card jamming system comprises a masking antenna portion 56 configured to broadcast a masking signal. In one embodiment the masking antenna portion comprises a cross-fed antenna having a first loop and a second loop wherein the first and second loops are fed from a common feed point.

In one embodiment, the RFID card comprises a battery operated transmitter coupled to the antenna to emit the jamming (noise) signal. In one embodiment the battery operated transmitter is relatively small compared with the size of the RFID card. One important feature of this antenna is that it exhibits a null 60 to any loop antenna that is placed parallel to it along a line 62 normal to its principle plane. Therefore, no noise is coupled to an RFID card (e.g. RFID card 53) held near it and centered relative the center of antenna 56. Likewise, the reader antenna (not shown) also meets these criteria for immunity to the noise source at the point that the RFID card 53 is optimally oriented toward it.

Figure 4:
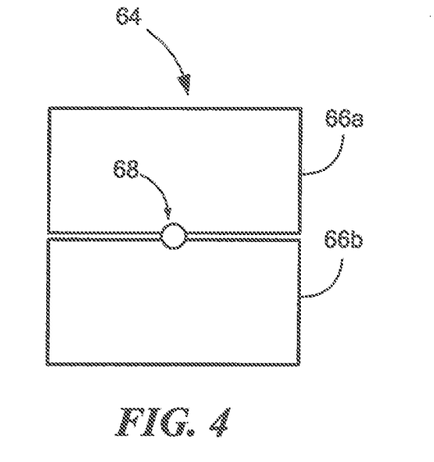
FIG. 4 is a schematic diagram of an exemplary cross-fed antenna.

Referring now to FIG. 4, a cross-fed antenna 64 includes first and second loops 66a, 66b each coupled to a common feed 68. It should be appreciated that cross-fed antenna 64 is operationally equivalent to two figure-eight style antennas that are superimposed on each other and fed with signals that are orthogonal (90 degrees out of phase) to each other. Each of the figure-eight equivalent antennas projects a field at right angles to the other. By introducing a 90 degree phase difference between the two feeds, the resultant fields are independent of each other in time, resulting in a donut shaped antenna pattern (e.g. such as that shown in FIG. 2A).

Cross-fed antenna 64 utilizes a structure composed of a substantially identical pair of loops 66a, 66b fed from a common point 68. In this way, the two substantially equal sized loops have currents that travel in opposite sense through each loop. That is, clockwise in one and counterclockwise in the other. The performance of antenna 64 is substantially the same as the performance of a conventional figure-eight antenna of substantially the same size, acting to cancel the far field radiation.

Figure 4A:
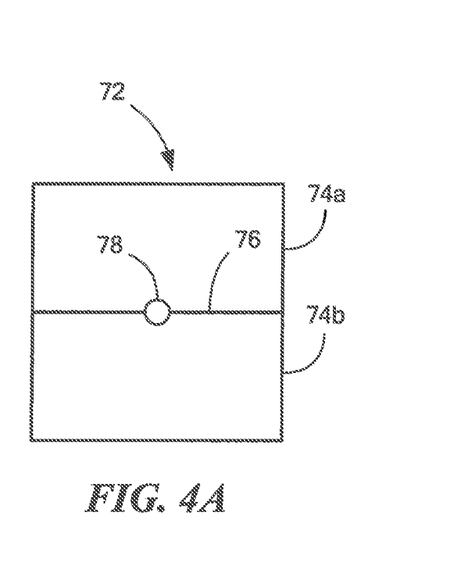
FIG. 4A is a schematic diagram of another exemplary cross-fed antenna.

Referring now to FIG. 4A a cross-fed antenna 72 includes loops 74a, 74b and a common feed 78. Antenna 72 is an alternate embodiment that joins adjacent legs of the two loops 74a, 74b into a single conductor 78, thus forming a single loop having a common centrally located feed 78, This arrangement simplifies construction while maintaining the figure-eight cancellation performance.

Figure 4B:
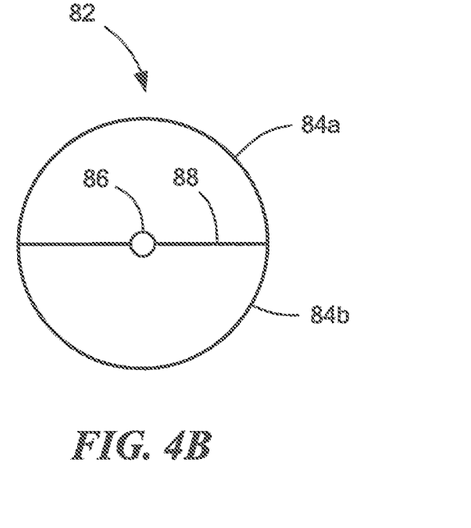
FIG. 4B is a schematic diagram of still another exemplary cross-fed antenna.

Referring now to FIG. 4B, cross-fed antenna 82 includes loops 84a, 84b and a common feed 86. Antenna 82 is an alternate embodiment that joins adjacent legs of the two loops 84a, 84b into a single conductor 88, thus forming a single loop having a common centrally located feed 86. FIG. 4B also illustrates the use of a shape other than a rectangle (in the exemplary embodiment of FIG. 4B, antenna loops 84a, 84b form a circle), for each of the component halves of this antenna. It should be appreciated that one requirement for the two halves is that they have at least half-plane symmetry around the feed leg, such that each half of the structure is equal in size and has a common side.

It should be appreciated that the cross-fed antenna structures described above differ substantially from previous radiation canceling antennas in that the two loop structures are fed in parallel, rather than a conventional series-fed, figure-eight topography.

One advantage of the cross-fed antenna structures described herein is that the parallel, two loop approach does not require the antenna conductors to cross over each other anywhere within the structure. In addition, it provides a centrally located feed point.

Each of the cross-fed antennas illustrated in FIGS. 4-4B have two points which are at ground potential (zero volts); when fed by a source that is balanced against ground, that is, supplies a voltage between −V and +V relative to ground, These points are where a line drawn vertically from the feed point intersects the outer conductor at the top and bottom of the outer edge of the loop. This means that it is possible to connect to these two points with an additional feed, without affecting the characteristics of the original loop configuration, thus instituting a new, independent feed point that is orthogonal to the original, The resultant field created by this additional feed point, illustrated in FIG. 5 F2, is rotated 90 degrees relative to the field of the first feed near its center.

Figure 5:
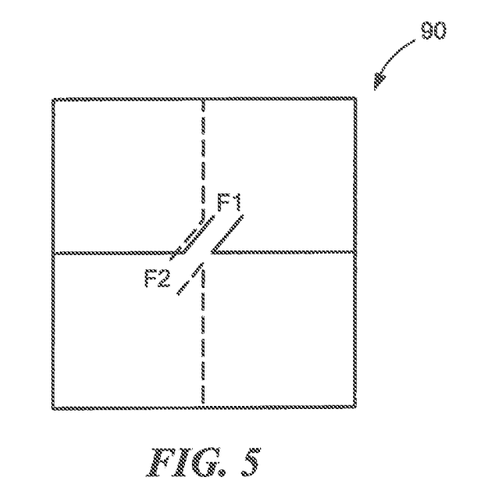
FIG. 5 is a schematic diagram of yet another exemplary cross-fed antenna.

Referring now to FIG. 5, an antenna 90 having two feed points, F1 and F2, fed in time-quadrature (90 time phase difference) creates a donut shaped antenna radiation pattern that is ideally omni-directional in azimuth in the planes parallel to the plane of the antenna (e.g. as illustrated in FIG. 2A).

One important aspect of the configuration of antenna 90 illustrated in FIG. 5, is that the near field components of the H-field are of an opposite polarity between the two halves of each antenna, i.e. left and right or top and bottom. This polarity opposition leads to decoupling of the resultant antenna from any nearby single turn loop that is that is parallel to the cross-fed antenna and positioned along its normal. Examples include those contained in a standard LF or HF, inductively coupled RFID card. There exists, therefore, a position where the RFID card is subjected to equal and opposite signals from the two halves of the antenna. This effect results in a cancellation of the two signal components, leading to a minimum coupling between the card and a signal impressed on the antenna.

In addition, when antenna 90 is properly positioned in front of an interrogation device (e.g. an RFID reader), the interrogation device is also substantially unaffected by the signal emanating from the cross-fed antenna 80 since the interrogation device is positioned within the null region of the cross-fed antenna 90.

Therefore, it is possible to introduce a signal in the vicinity of an RF device (e.g. an RFID card) such that the transaction between the RF device and its intended reader is masked by an intentional interfering signal without adversely affecting normal communication between the RF device and the reader. In this way, communication between the RF device and the reader (e.g. a transaction between an RFID card and an RFID reader) is made more secure. That is, any device used in an attempt to eavesdrop on transmissions between the RF device and the intended reader receives the transmissions embedded in the interference signal, thereby protecting the any information included in transmissions between the RF device and the intended reader from unauthorized listeners.

Another feature of the approach described herein is that implementing such a system does not require any modification to an existing reader infrastructure or to an existing RF device such as an RFID card. The entire system for protecting the RF device can be self-contained or integrated in the RF device itself or can be included in a frame or carrier in which the RF device is disposed.

It should be appreciated that the jamming signal source required to drive a cross-fed antenna of any of the types described herein can be as simple as a noise source, a power amplifier, a power source and an antenna tuning/matching network. Depending upon the intended life of the jamming signal, a primary power to power the jamming device could be provided by a small number of inexpensive coin style batteries. It is, therefore, possible to house the entire jamming system (i.e. noise source and antenna) in a package similar in size to a common ID card.

Figure 6:
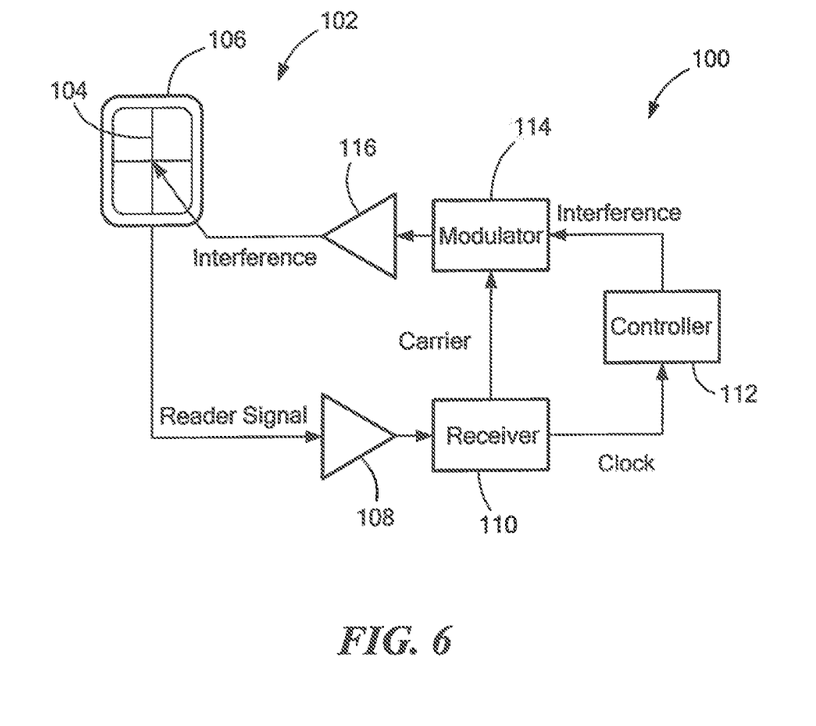
FIG. 6 is a schematic diagram of an RF jamming system adapted to be coupled to or integrated with an RF device.

Referring now to FIG. 6, in one exemplary embodiment, a jamming system 100 includes an antenna system 102 comprised of a masking antenna portion provided as cross-fed antenna 104 and a secondary reader loop antenna 106. Secondary reader loop antenna 106 operates to intercept at least a portion of an interrogation signal from an RFID reader (not shown in FIG. 6) and provides a sample of the interrogation signal to a receiver through an optional amplifier 108.

It should be appreciated that when secondary reader loop antenna 106 is disposed about a cross-fed antenna 104, secondary reader loop antenna 106 is isolated from a signal applied to and emitted from cross-fed antenna 104 as an interfering or masking signal. In one embodiment, secondary reader loop antenna 106 may be provided as loop antenna. For example, secondary reader loop antenna 106 may be provided as loop antenna having a single turn or having multiple turns (but without a central turn). Secondary reader loop antenna 106 may, of course, also be provided as any type of antenna (including non-loop antennas) having symmetry around about its center so as to remain decoupled from the RFID card jamming antenna (e.g. cross-fed antenna 104).

Receiver 110 samples the RF signal provided by antenna 106 to generate a dock signal. Receiver 110 provides dock signal to a controller 112 and carrier signal to a modulator 114. Controller 112 receives the message signal and generates a pseudo-random bitstream of the proper length at the dock rate to form an interference signal and provides the interference signal to modulator 114. This process mimics that of a normally functioning RFID controller, except that it does not generate a consistent data set, but rather one that changes over time. Modulator 114 provides an RF interference signal to amplifier 116 which in turn couples the RF interference signal to jamming antenna 104 which emits the jamming signal.

The interrogation signal sample from an RFID reader provided by secondary reader loop antenna 106 operates to provide a reference signal that is processed for use as a local oscillator signal to implement a coherent spoofing algorithm. That is, the interfering signal is structured exactly like that of one or more RFID devices (e.g. RFID cards) in the immediate vicinity of the card being protected. These added signals appear as code collisions to an eavesdropping receiver (e.g. eavesdropper 38 in FIG. 2) making it nearly impossible to distinguish the interfering signals from real RFID responses. However, because of the isolation provided from the jammer antenna 104 relative to the nearby intended reader, the intended receiver remains unaffected by this spoofing signal.

In an alternate implementation, secondary reader loop antenna 106 also provides the ability to activate the jammer signal only when it is in the near vicinity of an interrogating reader. This ability conserves the battery and limits the amount of information the eavesdropper can gain from long term data collection of the jammer's signal. Limiting access to long term samples of the jammer signal further improves the robustness of the protection by hampering techniques to filter or cancel the interference based on a priori knowledge of the jammer signal's characteristics.

It should be appreciated that jamming system 100 may be provided in whole or In part as an integrated portion of an RFID card or other RF device. Alternatively, all or portions of jamming system 100 may be provided in whole or in part as an appliqué or frame or carrier or any separate structure which may be coupled to an RF or other device including but not limited to an RFID card, a credit card, or any other support material having information stored thereon (e.g. a substrate).

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A radio frequency identification (RFID) card for use with an RFID reader, the RFID card comprising:
  a substrate;
  an RFID antenna disposed on said substrate, said RFID antenna configured on said substrate to be responsive to RFID reader signals provided thereto along a first direction;
  a jamming system coupled to said substrate and configured to emit masking signals in directions other than the first direction so as to not interfere with communications between said RFID antenna and the RFID reader, wherein the jamming system comprises a cross-fed antenna, the cross-fed antenna aligned with the RFID antenna such that signals emitted from the cross-fed antenna are not received by the RFID antenna; and
  a secondary antenna disposed about the cross-fed antenna wherein said secondary antenna is configured as a pick-up loop to provide a sample of an interrogation signal from an RFID reader, wherein the secondary antenna is positioned with respect to the cross-fed antenna such that the secondary antenna is isolated from an interference signal provided to the cross-fed antenna;
  wherein the secondary antenna is configured to activate a jammer signal only when the secondary antenna is in the near vicinity of an interrogating reader and wherein when the secondary antenna does not activate a jammer signal, the jamming system conserves power and limits an amount of information an eavesdropper can gain from long term data collection of the jammer signal.

2. The RFID card of claim 1 wherein said cross-fed antenna comprises:
  a pair of loops; and
  a common feed point.

3. The RFID card of claim 1 wherein said jamming system comprises:
  a cross-fed antenna comprising a pair of loops fed from a common feed point; and
  a transmitting device configured to provide a jamming signal, said transmitting device having an RF output port coupled to a first feed point of said cross-fed antenna such that a first feed signal provided thereto generates electrical currents in a first pair of loops wherein the electrical currents travel in opposite sense through each loop and having RF output port coupled to a second feed signal provided thereto generates at 90 degrees phase relative to the first electrical currents in a second pair of loops wherein the electrical currents travel in opposite sense through each loop so as together to form a radiation pattern having a donut shape.

4. The RFID card of darn 3 wherein a single conductor forms adjacent legs of the first two loops used in said cross-fed antenna and a second single conductor forms adjacent legs of the second two loops to provide a single loop having two common centrally located feeds.

5. The RFID card of claim 4 wherein each of said pair of loops are provided having one of:
- a square shape;
- a rectangular shape;
- a crossed rectangle shape;
- a circular shape;
- an oval shape;
- an octagonal shape;
- an hexagonal shape; and
- an diamond shape.

6. The RFID card of claim 4 wherein each loop is provided having at least half-plane symmetry around a feed leg, such that each half of the structure is equal in size and has a common side.

7. The RFID card of claim 1 wherein said jamming system further comprises:
a transmitting device coupled to the cross-fed antenna.

8. The RFID card of claim 7 wherein said transmitting device comprises:
- a noise source;
- a power amplifier; and
- a power source.

9. The RFID card of claim 1 wherein the sample of the interrogation signal from the RFID reader provides a reference that is processed for use as a local oscillator signal to implement coherent spoofing.

10. The RFID card of claim 9 wherein the interfering signal provided by said jamming system is structured like that of one or more RFID cards in the immediate vicinity of the card being protected.

11. The RFID card of claim 10 wherein the added signals appear as code collisions to the eavesdropping receiver making it nearly impossible to distinguish the interfering signals from the real RFID responses.

12. An RFID system comprising:
an RFID reader;
one or more RFID cards, each RFID card comprising:
  a substrate:
  an RFID antenna disposed on substrate, said RFID antenna configured on said substrate to be responsive to RFID reader signals provided thereto along a first direction; and
  a secondary antenna configured as a pick-up loop to provide a sample of an interrogation signal from an RFID reader, wherein the secondary antenna is configured to activate a jammer signal only when the secondary antenna is in the near vicinity of an interrogating reader;
wherein at least some of the RFID cards further comprise an integrated jamming system, the jamming system comprising:
(a) a cross-fed antenna aligned with the RFID antenna such that signals emitted from the cross-fed antenna are not received by the RFID antenna, wherein the secondary antenna is disposed about the cross-fed antenna and positioned with respect to the cross-fed antenna such that the secondary antenna is isolated from an interference signal provided to the cross-fed antenna; and
(b) a transmitting system coupled to the cross-fed antenna;
wherein the cross-fed antenna and transmitting system are configured to generate an antenna pattern having a null in the direction of the RFID reader, the null configured to enable communication between the RFID reader and the respective RFID card having the integrated jamming system, and to generate a jamming signal in other directions about the null direction, such that the jamming system does not interfere with communication between the RFID reader and the respective RFID card having the integrated jamming system; and
wherein when the secondary antenna dose not activate a jamming signal, the integrated jamming system conserves power and limits an amount of information an eavesdropper can gain from long term data collection of the jammer signal.

13. The RFID system of claim 12 wherein said cross-fed antenna is provided as a loop antenna having two isolated inputs, said loop antenna configured such that in response to being fed with signals that are in phase quadrature, said cross-fed antenna generates an omni-directional radiation pattern.

14. The RFID system of claim 13 wherein each of the one or more RFID cards comprises an RFID loop antenna and wherein said cross-fed antenna is disposed relative said an RFID loop antenna such that said RFID loop antenna is isolated from said cross-fed antenna.

15. An RFID method comprising:
(a) providing an RFID card comprising:
  (a-1) a substrate;
  (a-2) an RFID antenna disposed on substrate, said RFID antenna configured on said substrate to be responsive to RFID reader signal provided thereto along a first direction;
  (a-3) a jamming system coupled to said substrate and configured to emit masking signals in directions other than the first direction so as not to interfere with communications between said RFID antenna and the RFID reader, wherein the jamming system comprises a cross-fed antenna, the cross-fed antenna aligned with the RFID antenna such that signals emitted from the cross-fed antenna are not received by the RFID antenna; and
  (a-4) a secondary antenna disposed about the cross-fed antenna wherein said secondary antenna is configured as a pick-up loop to provide a sample of an interrogation signal from an RFID reader, wherein the secondary antenna is positioned with respect to the cross-fed antenna such that the secondary antenna is isolated from an interference signal provided to the cross-fed antenna;
  (a-6) wherein the secondary antenna is configured to activate a jammer signal only when the secondary antenna is in the near vicinity of an interrogating reader and wherein when the secondary antenna does not activate a jammer signal, the jamming system conserves power and limits an amount of information an eavesdropper can gain from long term data collection of the jammer signal;
(b) emitting a response signal from the radio frequency identification (RFID) card along a first direction; and
(c) emitting a masking signal from the RFID card at the same time the response signal is emitted, wherein the masking signal is emitted in a direction other than the first direction so as not to interfere with communications of the response signal to a receiving device.

16. The method claim of 15, wherein the masking signal is generated based upon the response signal.

17. The method of claim 16, wherein the masking signal appears as noise to mask the response signal.

18. The method of claim 16, further comprising determining if two interrogator signals are received at the RFID card within a predetermined period of time and generating a masking signal in response thereto.

19. The method of claim 15, wherein the masking signal is generated based upon another response signal from at least one other antenna in the area about the responder.

20. An antenna comprising:
an RFID antenna portion, the RFID antenna configured to be responsive to RFID reader signals provided thereto along a direction;
a jamming portion configured to emit masking signals in directions other than the first direction so as not to interfere with communications between the RFID antenna and an RFID reader, the jamming portion comprising:
  a masking antenna portion configured to broadcast the masking signals, said masking antenna portion comprising a cross-fed antenna having a first loop and a second loop wherein the first and second loops are fed from a common feed point, wherein the cross-fed antenna is aligned with the RFID antenna such that signals emitted from the cross-fed antenna are not received by the RFID antenna;
  a secondary antenna disposed about the cross-fed antenna wherein said secondary antenna is configured as a pick-up loop to provide a sample of an interrogation signal from an RFID reader, wherein the secondary antenna is positioned with respect to the cross-fed antenna such that the secondary antenna is isolated from an interference signal provided to the cross-fed antenna, wherein the secondary antenna is configured to activate a jammer signal only when the secondary antenna is in the near vicinity of an interrogating reader and wherein when the secondary antenna does not activate a jammer signal, the jamming system conserves power and limits an amount of information an eavesdropper can gain from long term data collection of the jammer signal; and
  a reader loop antenna portion configured to receive a response signal from a responder and decoupled from the masking antenna portion;
wherein the antenna is configured to permit the masking antenna to broadcast the masking signal at the same time that the reader loop antenna is receiving a response signal.

21. The system of claim 20, wherein when a feed signal provided to a feed point of said cross-fed antenna excites electrical current in a first pair of loops wherein the electrical currents travel in opposite sense through each loop and having an RF output port coupled to a second feed signal provided thereto generates at 90 degrees phase relative to the first electrical currents in a second pair of loops wherein the electrical currents travel in opposite sense through each respective loop so as together to form a radiation pattern having a donut shape.

22. The system of claim 21 wherein each respective pair of loops is a substantially identical pair of loops fed from the common feed point.

23. The antenna of claim 20, wherein said cross-fed antenna portion and said reader loop antenna portion are disposed in substantially parallel planes.

24. A method of transferring information between a radio frequency identification (RFID) card and an RFID reader, the method comprising:
providing an RFID card comprising:
  a substrate;
  an RFID antenna disposed on substrate, said RFID antenna configured on said substrate to be responsive to RFID reader signal provided thereto along a first direction;
  a jamming system coupled to said substrate and configured to emit masking signals in directions other than the first direction so as to not interfere with communications between said RFID antenna and the RFID reader, wherein the jamming system comprises a cross-fed antenna, the cross-fed antenna aligned with the RFID antenna such that signals emitted from the cross-fed antenna are not received by the RFID antenna; and
  a secondary antenna disposed about the cross-fed antenna wherein said secondary antenna is configured as a pick-up loop to provide a sample of an interrogation signal from an RFID reader, wherein the secondary antenna is positioned with respect to the cross-fed antenna such that the secondary antenna is isolated from an interference signal provided to the cross-fed antenna, wherein the secondary antenna is configured to activate a jammer signal only when the secondary antenna is in the near vicinity of an interrogating reader and wherein when the secondary antenna does not activate a jammer signal, the jamming system conserves power and limits an amount of information an eavesdropper can gain from long term data collection of the jammer signal;
in response to an interrogation signal provided by the RFID reader, the interrogation signal oriented along the first direction:
  generating a masking signal wherein the masking signal originates on or proximate the RFID card, the masking signal oriented in a second direction, the second direction being a direction other than the first direction so as not to interfere with communications between the RFID reader and the RFID card; and
  generating a response signal in the RFID card and providing the response signal to the RFID reader; and
providing the response signal from the RFID card to the RFID reader.

25. The method of claim 24, wherein the masking signal originates from one of:
the RFID card having a jamming antenna with an antenna pattern null aligned with the RFID reader; and
carrier for a portable electronic device, wherein said carrier comprises a jamming antenna, wherein said carrier is disposed proximate the RFID card and is aligned with the RFID card such that an antenna pattern null of the jamming antenna is aligned with the RFID reader.

26. The method of claim 24, wherein generating a masking signal comprises generating the masking signal based upon the response signal.

27. The method of claim 24, wherein generating a masking signal comprises generating the masking signal based upon another response signal from at least one other antenna in the area about the antenna.

28. A portable jamming system for use with a radio frequency (RF) device, the portable jamming system comprising:
a frame configured to be coupled to an RFID device;
a cross-fed antenna coupled to the frame, the cross-fed antenna comprising:
  a first loop;
  a second loop electrically coupled to the first loop; and
  a common feed point, wherein a current supplied to the common feed point causes the cross-fed antenna to generate an antenna radiation pattern having a donut shape wherein a null portion of the antenna radiation pattern is directed toward the RFID reader when the RFID card is aligned with the RFID reader, the antenna radiation pattern configured to interfere with communication with the RFID reader in areas outside of its null portion and to not interfere with communications with the RFID reader within its null portion;

a transmitter coupled to said frame and said cross-fed antenna;

a reader loop antenna configured to coupled a signal from an interrogator;

a spoofing system coupled to the cross-fed antenna and the reader loop antenna; and a spoofing system coupled to the cross-fed antenna and the reader loop antenna, the spoofing system comprising:

a receiver having an input coupled to receive a message signal from said reader loop antenna;

a controller coupled to receive a message signal from the receiver and to generate an interference signal at an output therefore; and a modulator having a first input coupled to receive a carrier signal from the receiver, having a second input coupled to the output of the controller and having an output signal coupled to the cross-fed antenna.

* * * * *